(12) United States Patent
Lin

(10) Patent No.: US 11,907,509 B1
(45) Date of Patent: Feb. 20, 2024

(54) DISKLINK SYSTEM

(71) Applicant: NAN YA PLASTICS CORPORATION, Taipei (TW)

(72) Inventor: Fong-Chin Lin, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 0 days.

(21) Appl. No.: 18/155,038

(22) Filed: Jan. 16, 2023

(30) Foreign Application Priority Data

Oct. 27, 2022 (TW) .................................. 111140877

(51) Int. Cl.
*G06F 3/0484* (2022.01)
*G06Q 30/0601* (2023.01)
*G06F 3/0483* (2013.01)

(52) U.S. Cl.
CPC .......... *G06F 3/0484* (2013.01); *G06F 3/0483* (2013.01); *G06Q 30/0641* (2013.01)

(58) Field of Classification Search
None
See application file for complete search history.

(56) References Cited

U.S. PATENT DOCUMENTS

| | | | | |
|---|---|---|---|---|
| 7,517,086 B1 * | 4/2009 | Kurkure | ............... | G09B 21/008 351/246 |
| 8,341,026 B1 * | 12/2012 | Mirchandani | .......... | G06Q 30/02 705/26.1 |
| 2002/0073049 A1 * | 6/2002 | Dutta | ................... | G06Q 20/401 705/26.1 |
| 2004/0102993 A1 * | 5/2004 | Yoshida | ................. | H04L 67/02 705/14.19 |

(Continued)

FOREIGN PATENT DOCUMENTS

| | | | |
|---|---|---|---|
| CN | 111064795 A | 4/2020 | |
| CN | 111639924 A | 9/2020 | |

(Continued)

OTHER PUBLICATIONS

Jonathan Stark, "Building Android Apps with HTML, CSS, and JavaScript", O'Reilly Media,Inc., Oct. 7, 2010 (Oct. 7, 2010), XP055484089, ISBN:978-1-449-38326-8, pp. 13,19,25.

*Primary Examiner* — Mandrita Brahmachari
(74) *Attorney, Agent, or Firm* — Li & Cai Intellectual Property Office

(57) ABSTRACT

A DiskLink system is provided in the present disclosure. The DiskLink system is established on a cloud-based network, and is formed by cloud-based disks connecting to each other in a way similar to that of a neural network system. The DiskLink system includes information webpages that each display virtual reality scenes. When any movement option of one information webpage is selected, an information webpage program of the information webpage stores a movement record data in a browser. When each of the information webpages is executed, the information webpage program loads the movement record data from the browser and displays a previous webpage option. When the previous webpage option is selected, the browser displays a previous webpage address in the previous webpage option, and the information webpage program uses the movement record data to simulate a user selecting the movement options to change the virtual reality scenes.

10 Claims, 10 Drawing Sheets

(56) References Cited

U.S. PATENT DOCUMENTS

| | | | | |
|---|---|---|---|---|
| 2007/0015118 | A1* | 1/2007 | Nickell | G09B 7/02 434/118 |
| 2007/0100705 | A1* | 5/2007 | Chen | G06Q 30/0617 705/26.35 |
| 2008/0266298 | A1* | 10/2008 | Hess | G01C 21/3673 345/467 |
| 2009/0249189 | A1* | 10/2009 | Jania | G06F 40/143 715/234 |
| 2012/0066074 | A1* | 3/2012 | Adams | G06Q 30/0225 705/14.69 |
| 2013/0073953 | A1* | 3/2013 | Onyenobi | A61P 25/28 715/252 |
| 2014/0013258 | A1* | 1/2014 | Jang | G06F 9/451 715/769 |
| 2014/0074588 | A1* | 3/2014 | Bertsch | G06Q 30/02 705/14.42 |
| 2014/0218385 | A1* | 8/2014 | Carmi | G06V 10/25 345/620 |
| 2016/0342591 | A1* | 11/2016 | Zholudev | H04L 67/1044 |
| 2017/0068829 | A1* | 3/2017 | Shaw | G06F 21/50 |
| 2017/0371844 | A1* | 12/2017 | Yao | G06F 40/106 |
| 2019/0102362 | A1* | 4/2019 | Orciuoli | G06F 16/957 |
| 2019/0147026 | A1* | 5/2019 | Jon | G06F 3/04845 715/230 |
| 2021/0089334 | A1* | 3/2021 | Thota | G06V 30/19173 |
| 2022/0180332 | A1* | 6/2022 | Cheng | G06Q 20/3829 |

FOREIGN PATENT DOCUMENTS

| | | | | |
|---|---|---|---|---|
| EP | 2124157 | A1 * | 11/2009 | ......... G06F 16/9562 |
| TW | 202034182 | A | 9/2020 | |
| TW | M629358 | U | 7/2022 | |

* cited by examiner

DISKLINK SYSTEM

CROSS-REFERENCE TO RELATED PATENT APPLICATION

This application claims the benefit of priority to Taiwan Patent Application No. 111140877, filed on Oct. 27, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an information system, and more particularly to a cloud-based DiskLink system.

BACKGROUND OF THE DISCLOSURE

In existing virtual tours or virtual reality websites, a user can change a virtual reality scene by selecting relevant options on the virtual reality scene to obtain an experience similar to that of being in a virtual reality.

In certain websites providing virtual tours, the user can also see introductive options that are provided for being selected in the virtual reality scene. After the user selects the introductive options, the user can switch to viewing a different webpage or a different virtual reality scene. In such websites, the user may move around in the virtual reality for a while before selecting one of the introduction options on the virtual reality scene and moving to another webpage. Generally, when the user attempts to go back to a previous one of the virtual reality webpages after viewing the another webpage, the user only can use a previous webpage button of a browser; however, by using the previous webpage button of the browser to switch the webpage back to the previous virtual reality webpage, the user sees an initial virtual reality scene instead of returning to a previous scene at which the user arrived after moving for a certain distance, such as to provide a poor user experience.

SUMMARY OF THE DISCLOSURE

In response to the above-referenced technical inadequacies, the present disclosure provides a DiskLink system that is mainly used to improve the existing virtual tour that may bring a poor experience to users.

The present disclosure provides a DiskLink system that is mainly established on a cloud-based network, and the DiskLink system includes multiple cloud-based disks that are connected in a way similar to that of a neural network system. Activities and messages of a large enterprise can be integrated by a single cloud-based disk through a digital network system and systemically presented by using distributed footprint tracking, 3D audiovisual interaction, high-speed computing, and digital colony ecology; further, a virtual-reality simulation can be created using immersive experience and perception. By expanding the abovementioned single cloud-based disk to multiple cloud-based disks, a spectacular DiskLink system can be formed, in which the cloud-based disks are mutually connected with each other as in the neural network system; furthermore, the DiskLink system can be adopted in various fields such as industry and commerce, various exhibitions, politics, arts, music, medicine, education, and military.

Each cloud-based disk in the DiskLink system can be optimized to provide from a traditional 2D mode to a 3D immersive experience, such as providing augmented reality (AR), virtual reality (VR), mixed reality (MR), extended reality (also called as X-reality or XR), etc. by integrating text, images, audio, and video into actual and virtual environments. Therefore, the user can be immersed in the virtual reality without attempting to distinguish the reality from a virtual creation, and a higher level of effect can be achieved to produce a higher value.

The DiskLink system of the present disclosure can be established on a blockchain, so that large amounts of data in the DiskLink system can be encrypted through the encryption technology of blockchain and become difficult to be tampered with. Furthermore, the data can achieve the effect of being difficult to be cracked and modified, so as to achieve the security of each platform in the DiskLink system; therefore, the DiskLink system can assist an enterprise to realize quality history and anti-counterfeiting applications of products to reduce the loss caused by counterfeiting. In addition, when products of the enterprise are in short supply, productivity is difficult to be increased in the short term, and a long term effect of investment on increasing productivity is unclear, the authentication mechanism of the blockchain can be used to regulate qualified third parties, so that the qualified third parties can become a member of the supply chain of the enterprise in the short term and assist the enterprise to expand business income and reduce investment risks.

Because important democratic elections were held in Taiwan in the past couple of years, traditional campaigning activities to win approval and support from voters have been adopted by the public representatives such as mayor or the president. Large amounts of economic resources were spent during the campaign which is sometimes considered a waste of manpower and money. Specifically, the political promises put forward by candidates during the election campaign and the results of administration after the candidates are elected are often different, and oftentimes the candidates may outright break promises to voters. In one of the embodiments of the DiskLink system of the present disclosure running on the blockchain, each information webpage can be used as a candidate campaign page, and the candidate can show the political ideas, political views, education, careers, etc. that need to be propagated in the candidate campaign page by text and images. Therefore, voters can view all the necessary information of the candidate in the candidate campaign page; furthermore, the candidate can present the candidate or the campaign venue in virtual reality images of the candidate campaign page, so that voters can experience an immersive experience similar to attending the campaign venue in person. The voters can check the candidate campaign page again to verify whether or not the candidate that has taken the elected position for a certain period of time has fulfilled the promises that were made during the election process by utilizing the tamper-proof, open, and transparent characteristics of the blockchain. As mentioned above, the use of the information webpage as the candidate campaign page allows the candidate to be more cautious in presenting relevant publicity information, so that the election can move toward the goal of electing the wise and capable.

In one of the embodiments of the DiskLink system of the present disclosure running on the blockchain, each information webpage can also be used as an item purchase webpage, and the user can purchase items through the item purchase webpage. Since the information webpage is a decentralized application built on the blockchain, the transaction history of the user in the information webpage will be recorded in the blockchain, and the user will be able to conduct transactions in the information webpage with relative peace of mind because the data of the blockchain is not easily to be tampered with. In a preferred embodiment, the information webpage can also be used in coordination with the technology of smart contracts; after the user places an order in the information webpage, the user can automatically make payment and refund through smart contracts, thereby ensuring transaction security for the user.

In one aspect, the present disclosure provides a DiskLink system. The DiskLink system is operated in at least one computer device, and includes a plurality of thematic information websites. Each of the plurality of thematic information websites includes a plurality of information webpages, and each of the plurality of information webpages includes an information webpage program. Each of the plurality of information webpages is configured to be browsed by a user and presents at least one content information, and at least one of the information webpages displays at least one image of a virtual reality scene. The virtual reality scene is formed by multiple ones of the at least one image. Each of the information webpages displays a plurality of movement options, and the information webpage program makes the information webpage display another one image of the virtual reality scene according to manipulations of the user on the movement options. When each time any of the movement options is selected, the information webpage program stores one piece of movement record data in a storage of a browser that executes the information webpage. When the information webpage program stores a next one of the movement record data in the browser, the information webpage program first loads an original one of the movement record data from the storage, attaches a first preset string to one end of the original one of the movement record data, attaches the next one of the movement record data to one end of the first preset string, and replaces the original one of the movement record data stored in the storage with a movement record data that has the original one of the movement record data, the next one of the movement record data, and the first preset string attached thereon. Each of the information webpages displays at least one linking option, and the linking option stores a linking address of another one of the information webpage. When any of the linking options is selected, the information webpage program attaches a second preset string to one end of a current webpage address of the information webpage, attaches the movement record data that has the original one of the movement record data and the next one of the movement record data attached thereon in the storage to one end of the second preset string to form a previous webpage address, and stores the previous webpage address in the storage so that the browser displays the information webpage corresponding to the linking address. When any of the information webpages is executed, the information webpage program reads the storage of the browser and determines whether or not the previous webpage address is stored in the storage. If the information webpage program determines that the previous webpage address is stored in the storage, the information webpage program displays a previous webpage option in the information webpage. When the previous webpage option is selected, the information webpage program makes the browser display an information webpage that corresponds to the previous webpage address. When any of the information webpages is executed, the information webpage program determines whether or not a webpage address of the information webpage includes the second preset string. When the information webpage program determines that the webpage address of the information webpage includes the second preset string, the information webpage program uses the second preset string and the first preset string to resolve all the movement record data from the webpage address of the information webpage. The information webpage program makes at least one of the movement options of the information webpage be selected according to all the movement record data that are resolved, so that a corresponding image is displayed in the virtual reality scene.

In certain embodiments, the DiskLink system is further operated in multiple ones of the computer device. A blockchain is operated in the DiskLink system, and each of the thematic information websites is a decentralized application.

In certain embodiments, at least one of the thematic webpages is a cloud-based web shopping center, and when each of the information webpages of the cloud-based web shopping center is executed, the information webpage program uses an identification data of the information webpage to find a total request number from a database of a server, and displays the total request number, an inspection request option, and an ordering option in the information webpage. When the inspection request option is selected, the information webpage program makes the information webpage display a payment window and a payment confirmation option for the user to input a payment data in the payment window. After the payment confirmation option is selected, the information webpage program transmits the payment data to a cash-flow payment system to use the cash-flow payment system to transfer a preset amount from an account corresponding to the payment data to a public account and obtain a payment success information returned from the cash-flow payment system, and the information webpage program updates the information webpage and the total request number in the database, such that a value of a previous one of the total request number is added by one and is updated to an updated total request number. When the total request number is equal to a preset total request number, the information webpage program stores an item sales prohibition data corresponding to the identification data in the database. The information webpage program uses the public account, a physical address of an inspection institution, and the cash-flow payment system to transfer an item amount from the public account to a vendor account of a vendor corresponding to the information webpage for establishing an inspection order, so that the vendor sends an item to the physical address of the inspection institution. When the information webpage is executed, if the information webpage program finds a corresponding item sales prohibition data from the database by using the identification data, the information webpage program makes the information webpage display the ordering option to be prohibited from being selected.

In certain embodiments, a value of the preset amount multiplied by the preset total request number is not less than a sum of a unit price of the item that is sold on the information webpage and a preset inspection fee.

In certain embodiments, the preset amount is not greater than 10% of the unit price of the item that is sold on the information webpage.

In certain embodiments, when the payment confirmation option is selected and the information webpage program obtains the payment success information that is returned from the cash-flow payment system, the information webpage program stores a user payment record in the database of the server. When the information webpage is executed, the information webpage program uses the identification data to find whether or not a corresponding start date is present in the database. If the start date is found, the information webpage program displays the start date on the information webpage. When the inspection request option is selected and the information webpage program obtains the payment success information that is returned from the cash-flow payment system, the information webpage program uses the identification data to find whether or not the corresponding start date is present in the database. If the start date is not found, the information webpage program stores a current date in the database as the start date, and if the information webpage finds the start date, the information webpage program displays the start date on the information webpage. The information webpage program calculates a difference between the current date and the start date, and if the information webpage program determines that the difference is greater than a preset number of days and the total request number is less than the preset total request number, the information webpage program refunds the preset amount previously paid by the user from the public account to a user account of the user via the cash-flow payment system according to the user payment record stored in the database.

In certain embodiments, after the information webpage program establishes the inspection order, the information webpage program stores in the database an inspection order information and the content information that correspond to the identification data. When an inspection institution interface of the DiskLink system is executed, an inspection institution interface program of the inspection institution interface reads the database and display in the inspection institution interface the inspection order, the content information, an inspection report upload option, an inspection success option, and an inspection failure option. When the inspection report upload option is selected, the inspection institution interface program makes the inspection institution interface display a data upload window requesting an operator to upload an inspection report. After the operator uploads the inspection report via the data upload window, the inspection institution interface program stores in the database the inspection report corresponding to the identification data. When the inspection success option is selected, the inspection institution interface program correspondingly generates an inspection success information. When the inspection failure option is selected, the inspection institution interface program correspondingly generates an inspection failure information. When the information webpage is executed, if the information webpage program finds the inspection report in the database by using the identification data, the information webpage program displays an inspection report option on the information webpage. If the information webpage program finds the inspection failure information in the database by using the identification data, the information webpage program configures the ordering option displayed on the information webpage to be prohibited from being selected. If the information webpage program finds the inspection success information in the database by using the identification data, the information webpage program configures the ordering option displayed on the information webpage to be selectable. When the inspection report option is selected, the information webpage program displays the corresponding inspection report on the information webpage, or the information webpage program makes the browser download the inspection report.

In certain embodiments, when the payment confirmation option is selected and the information webpage program obtains the payment success information returned from the cash-flow payment system, the information webpage program stores the user payment record in the database of the server. If the information webpage program finds an inspection failure information in the database by using the identification data, the information webpage program transfers an amount that is equal to the preset amount multiplied by the preset total request number from the vendor account to the public account via the cash-flow payment system, and the information webpage program refunds the preset amount previously paid by the user to the user account by using the cash-flow payment system, according to the user payment record stored in the database.

In certain embodiments, when each of the information webpages of the cloud-based web shopping center is executed, the information webpage program further finds a total paid amount in the database by using the identification data of the information webpage and displays in the information webpage the total request number, the inspection request option, the ordering option, and the total paid amount. When the inspection request option is selected, the information webpage program makes the information webpage display the payment window, the payment confirmation option, and a payment amount input box, and the payment amount input box allows the user to input a payment amount. When the payment confirmation option is selected and the payment amount input box is used to input the payment amount, the information webpage program transfers the payment amount from an account corresponding to the payment data to the public account by using the cash-flow payment system and obtains the payment success information returned from the cash-flow payment system, and the information webpage program updates the information webpage, and the total request number and the total paid amount of the database. When the total paid amount exceeds a preset total paid amount, the information webpage program is able to store in the database the item sales prohibition data corresponding to the identification data, and the information webpage program transfers an item amount from the public account to the vendor account corresponding to the information webpage by using the public account, the physical address of the inspection institution, and the cash-flow payment system so as to establish the inspection order for the vendor to send the item to the physical address of the inspection institution.

In certain embodiments, the preset total paid amount is not less than a sum of a unit price of an item that is sold on the information webpage and a preset inspection fee.

Therefore, compared to conventional virtual tour websites, users can have an improved browsing experience in the DiskLink system provided by the present disclosure.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
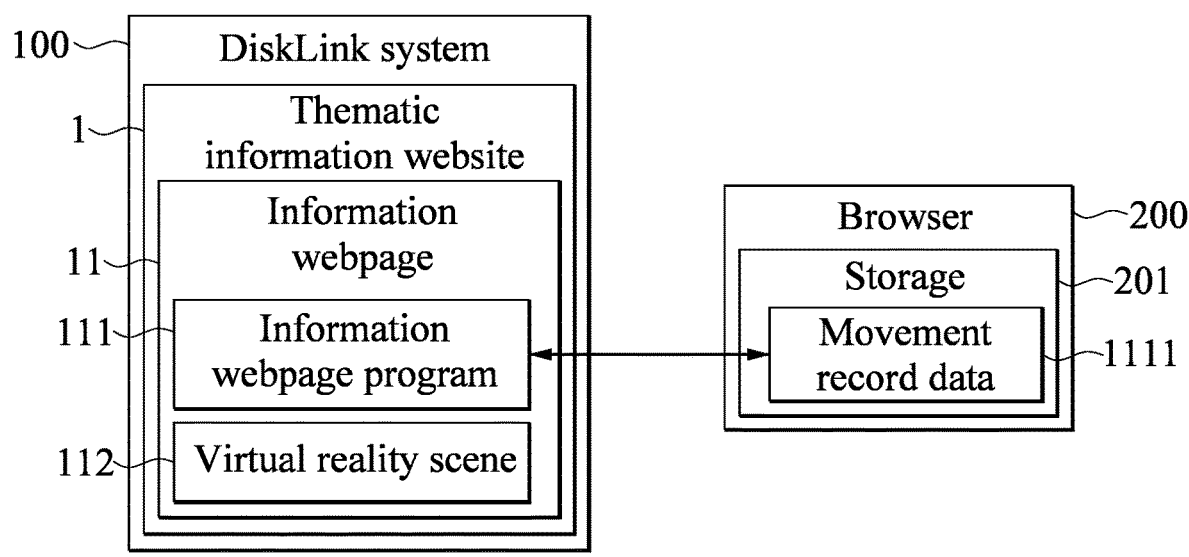
FIG. 1 is a function block diagram of a DiskLink system according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 6, FIG. 1 is a function block diagram of a DiskLink system according to a first embodiment of the present disclosure, and FIG. 2 to FIG. 6 are schematic diagrams of different information webpages of the DiskLink system of the present disclosure. A DiskLink system 100 of the present disclosure is operated in at least one computer device (e.g., a server 300). The DiskLink system 100 includes a plurality of thematic information websites, and each thematic information website 1 includes a plurality of information webpages 11, each of the information webpages 11 is configured to be browsed by a user, and each of the information webpages 11 presents at least one content information that may contain, for example, text, pictures, images, etc., and it is not limited thereto. In other words, the DiskLink system 100 of the present disclosure is a cloud-based information system including the plurality of thematic information websites 1 that can run on at least one computer device (e.g., a server).

In order to provide a good experience to users that browse each of the thematic information websites 1, each of the information webpages 11 may display a virtual reality scene 112 and a plurality of movement options 113, and each of the information webpages 11 can include an information webpage program 111. The virtual reality scene 112 may be formed by multiple images, so that the virtual reality scene 112 can present a 360-degree virtual reality image. The virtual reality scene 112 may, for example, be formed by a plurality of real images; on the other hand, the virtual reality scene 112 may also be formed by a plurality of virtual images.

The information webpage program 111 may, for example, be compiled using a web programming language such as JavaScript, and the information webpage program 111 is stored on the information webpage 11. The information webpage program 111 can detect which of the movement options 113 of the information webpage 11 is selected by the user, and the information webpage program 111 can accordingly change the images presented on the virtual reality scene 112. The virtual reality scene 112, the information webpage program 111, and the movement options 113 of each of the information webpages 11 can be constructed by using various existing virtual tour software (e.g., GoThru®, Panoskin®, etc.), and will not be described herein.

The difference between the information webpages 11 of the present disclosure and the existing websites built with virtual tour software is that, when each time the movement option 113 is selected, the information webpage program 111 will store one piece of movement record data 1111 in a storage 201 (e.g., cookie, localstorage, or sessionstorage) of a browser 200 that executes the information webpage 11. When the information webpage program 111 stores a next one of the movement record data 1111 in the storage 201 of the browser 200, the information webpage program 111 first loads an original one of the movement record data 1111 from the storage 201, attaches a first preset string to one end of the original one of the movement record data 1111, attaches the next one of the movement record data 1111 to one end of the first preset string, and replaces the original one of the movement record data 1111 stored in the storage 201 with a movement record data 1111 that has the original one of the movement record data 1111, the next one of the movement record data 1111, and the first preset string attached thereon.

Figure 2:
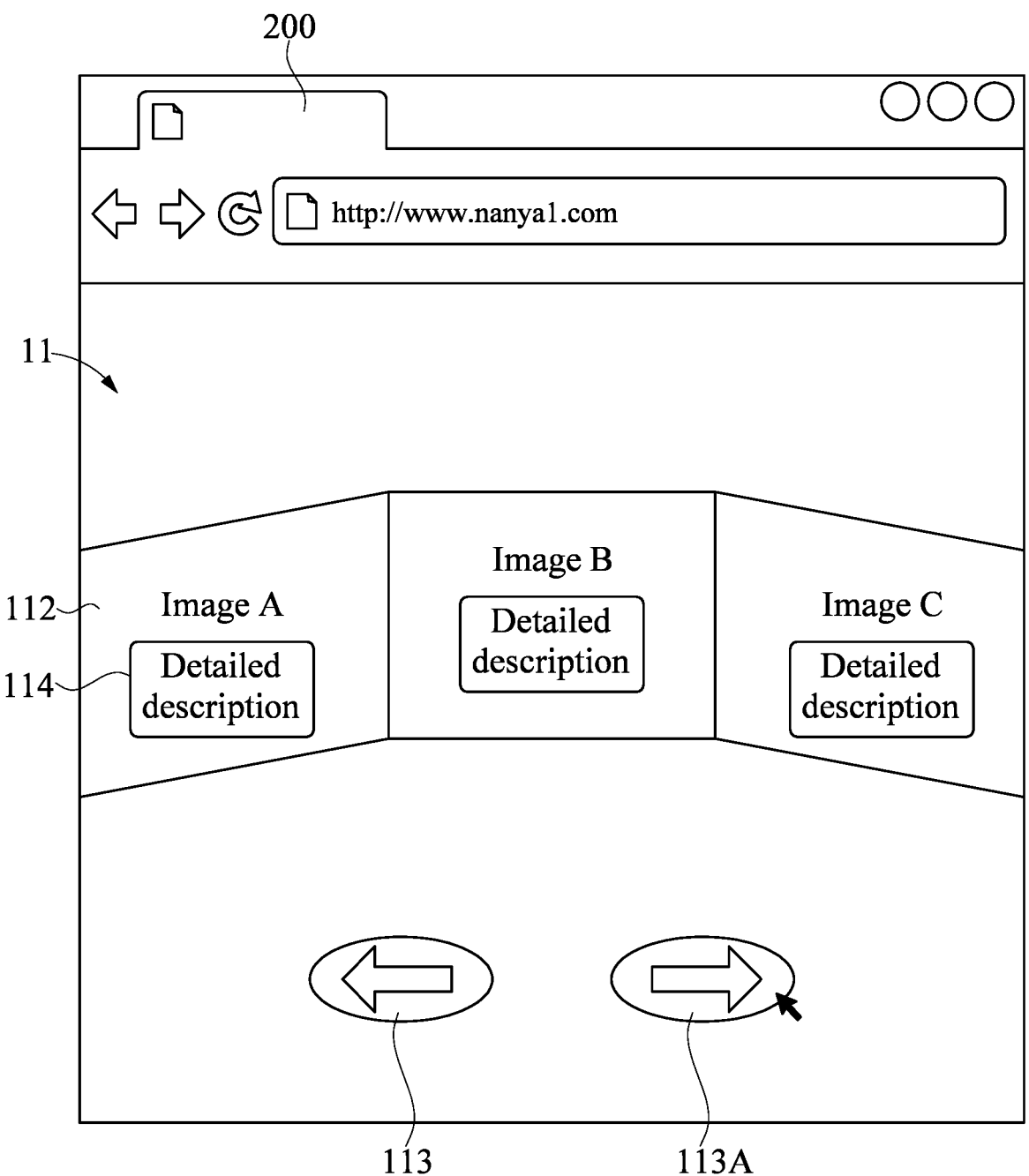
FIG. 2 to FIG. 6 are schematic diagrams of different information webpages of the DiskLink system of the present disclosure.
Figure 3:
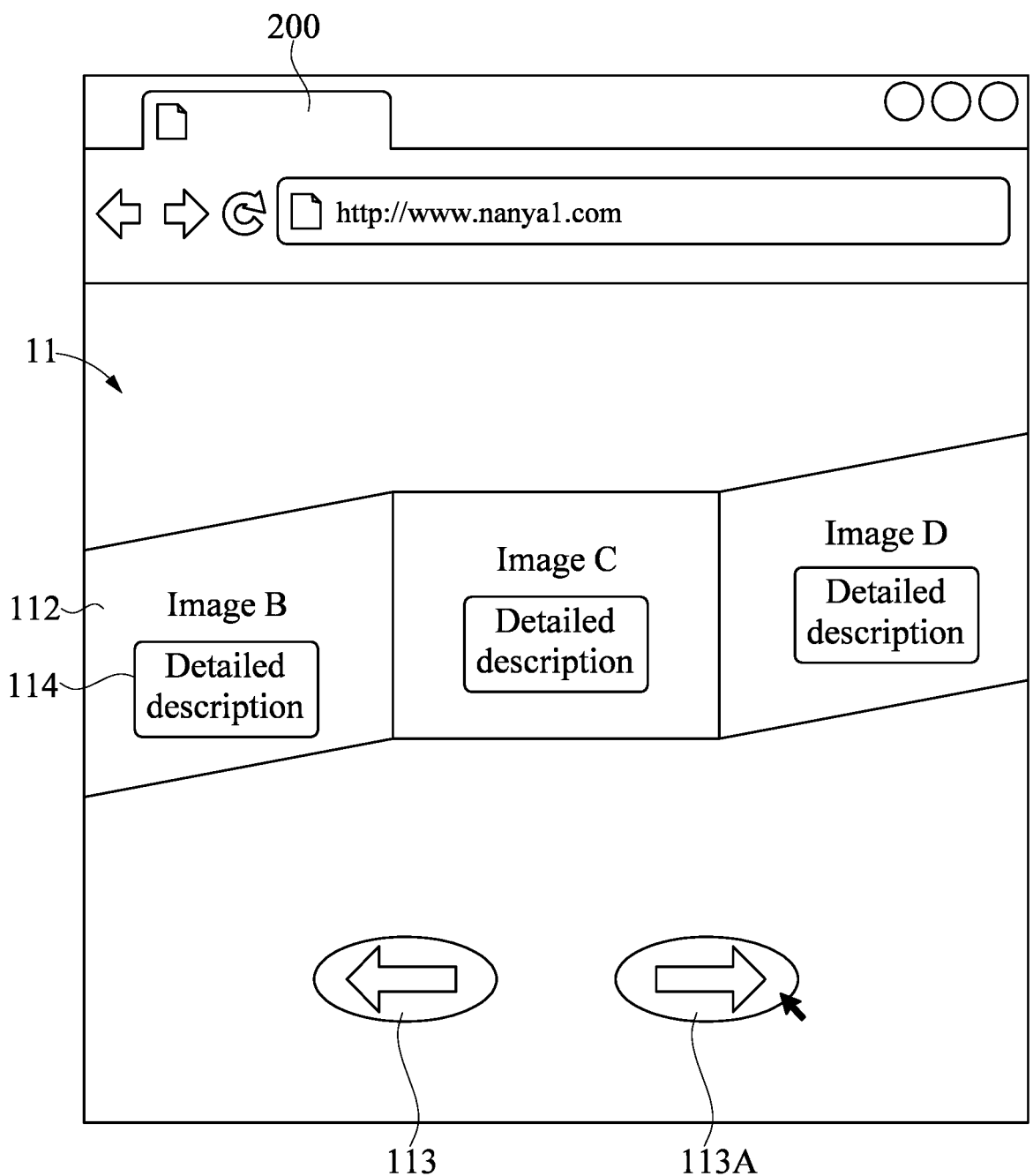

For example, if the user selects the movement option 113A indicating a rightward movement in the information webpage 11 as shown in FIG. 2, the image in the middle of the virtual reality scene 112 will switch from an image B to an image C. Accordingly, the user will be able to view the information webpage 11 as shown in FIG. 3. At this time, the information webpage program 111 will store a movement record data 1111 in the storage 201 of the browser 200, such as the unique name (e.g., buttonright_1) corresponding to the movement option 113 that is selected.

Figure 4:
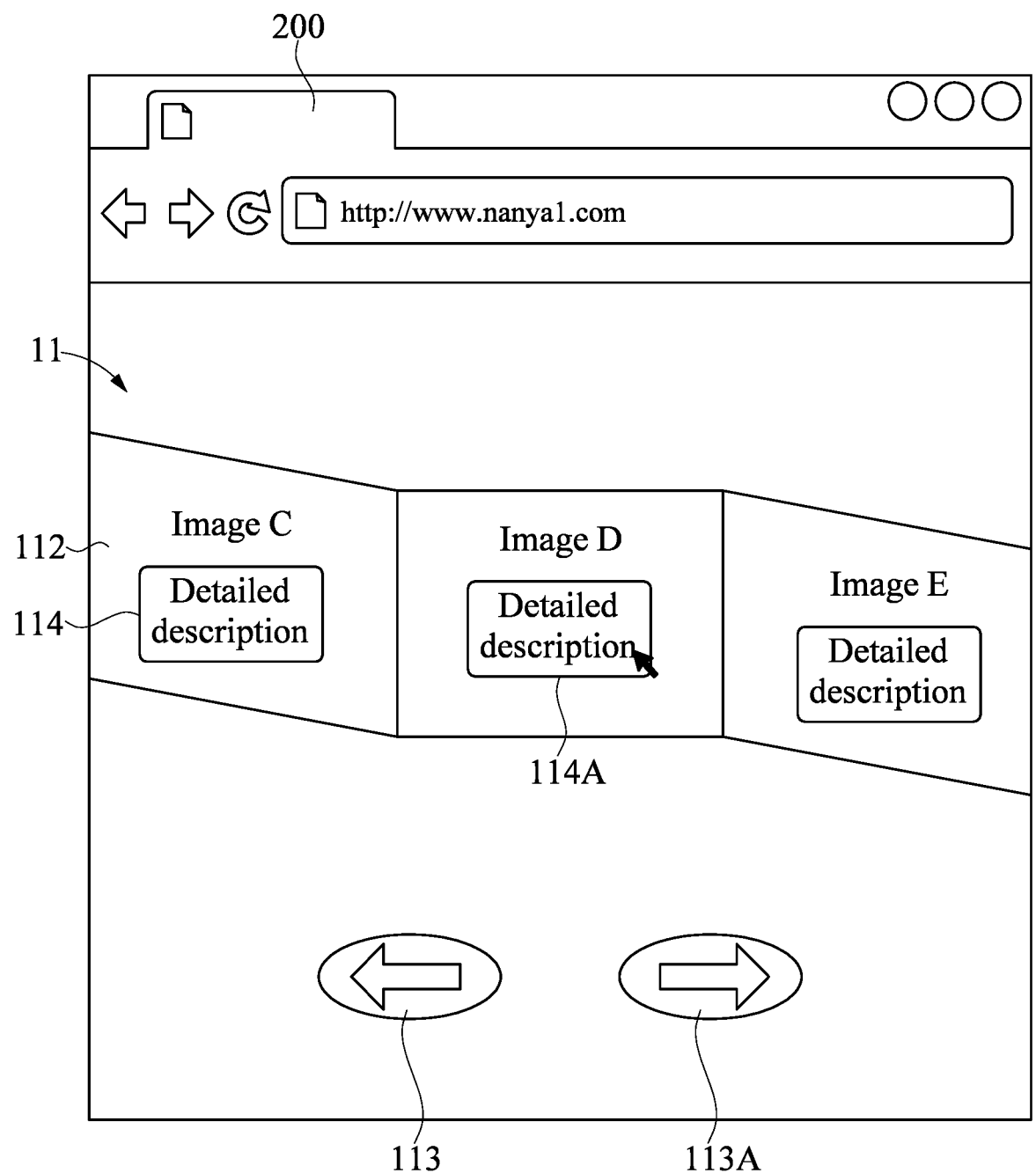

As shown in FIG. 3 and FIG. 4, assuming that the user again selects the movement option 113A indicating a rightward movement in the information webpage 11 as shown in FIG. 3, the user will see that the information webpage 11 is converted from the virtual reality scene 112 as shown in FIG. 3 to the virtual reality scene 112 as shown in FIG. 4, i.e., the image C located in the middle of the virtual reality scene 112 as shown in FIG. 3 will be changed to an image D, and the image C and an image E are located on two sides of the image D. At this time, the information webpage program 111 first loads the original one of the movement record data 1111 (e.g., buttonright_1) stored in the storage 201 of the browser 200, attaches a first preset string (e.g., "&") to one end of the original one of the movement record data 1111, attaches a next one of the movement record data 1111 (e.g., buttonright_1) to one end of the first preset string, and stores a movement record data 1111 (e.g., buttonright_1&buttonright_1) that has the original one of the movement record data 1111, the next one of the movement record data 1111, and the first preset string attached thereon back in the storage 201 to replace the original one of the movement record data 1111 (e.g., buttonright_1). In practice, the content of the string specifically stored in each movement record data 1111 is not limited by the above description, and any string that enables the information webpage program 111 to identify which one of the movement options 113 is currently selected in the information webpage 11 may be used.

Each information webpage 11 displays at least one linking option 114, and the linking option 114 stores a linking address to another information webpage 11. When any of the linking options 114 is selected, the information webpage program 111 attaches a second preset string to one end of a current webpage address of the information webpage 11, attaches the movement record data 1111 in the storage 201 to one end of the second preset string to form a previous webpage address, and stores the previous webpage address in the storage 201 so that the browser 200 displays the information webpage 11 corresponding to the linking address.

When any of the information webpages 11 is executed, the information webpage program 111 reads the storage 201 of the browser 200 and determines whether or not the previous webpage address is stored in the storage 201. If the information webpage program 111 determines that the previous webpage address is stored in the storage 201, the information webpage program 111 displays a previous webpage option 115 in the information webpage 11. When the previous webpage option 115 is selected, the information webpage program 111 makes the browser 200 display an information webpage 11 that corresponds to the previous webpage address.

When any of the information webpages 11 is executed, the information webpage program 111 determines whether or not a webpage address of the information webpage 11 includes the second preset string. When the information webpage program 111 determines that the webpage address of the information webpage 11 includes the second preset string, the information webpage program 111 uses the second preset string (and the first preset string) to resolve all the movement record data 1111 from the webpage address of the information webpage 11, and the information webpage program 111 makes at least one movement option 113A of the information webpage 11 be selected according to all the movement record data 1111 that are resolved, so that a corresponding image is displayed in the virtual reality scene 112.

Accordingly, assuming that the webpage address of the information webpage 11 as shown in FIG. 2 is "http://www.nanya1.com", when the user selects the movement option 113A as shown in FIG. 2 that indicates a rightward movement, the virtual reality scene 112 in the information webpage 11 is changed from FIG. 2 to FIG. 3. Furthermore, when the user selects the movement option 113A in the information webpage 11 as shown in FIG. 3, that indicates a rightward movement, the virtual reality scene 112 is changed from FIG. 3 to FIG. 4. At this time, the information webpage program 111 stores a movement record data 1111 in the storage 201 of the browser 200, and the movement record data 1111 can be "buttonright_1&buttonright_1". During the process of the virtual reality scene 112 of the information webpage 11 is changed from FIG. 2 to FIG. 4, the webpage address of the information webpage 11 remains to be "http://www.nanya1.com".

When the linking option 114A in the image D of the information webpage 11 as shown in FIG. 4 is selected, the information webpage program 111 will store the previous webpage address in the storage 201 of the browser 200, at this time, the previous webpage address can exemplarily be "http://www.nanya1.com?clickhistory=buttonright_1& buttonright_1," in which the string "?clickhistory=" is the second preset string, the string "&" is the first preset string, and the string "buttonright_1&buttonright_1" is the movement record data 1111.

Figure 5:
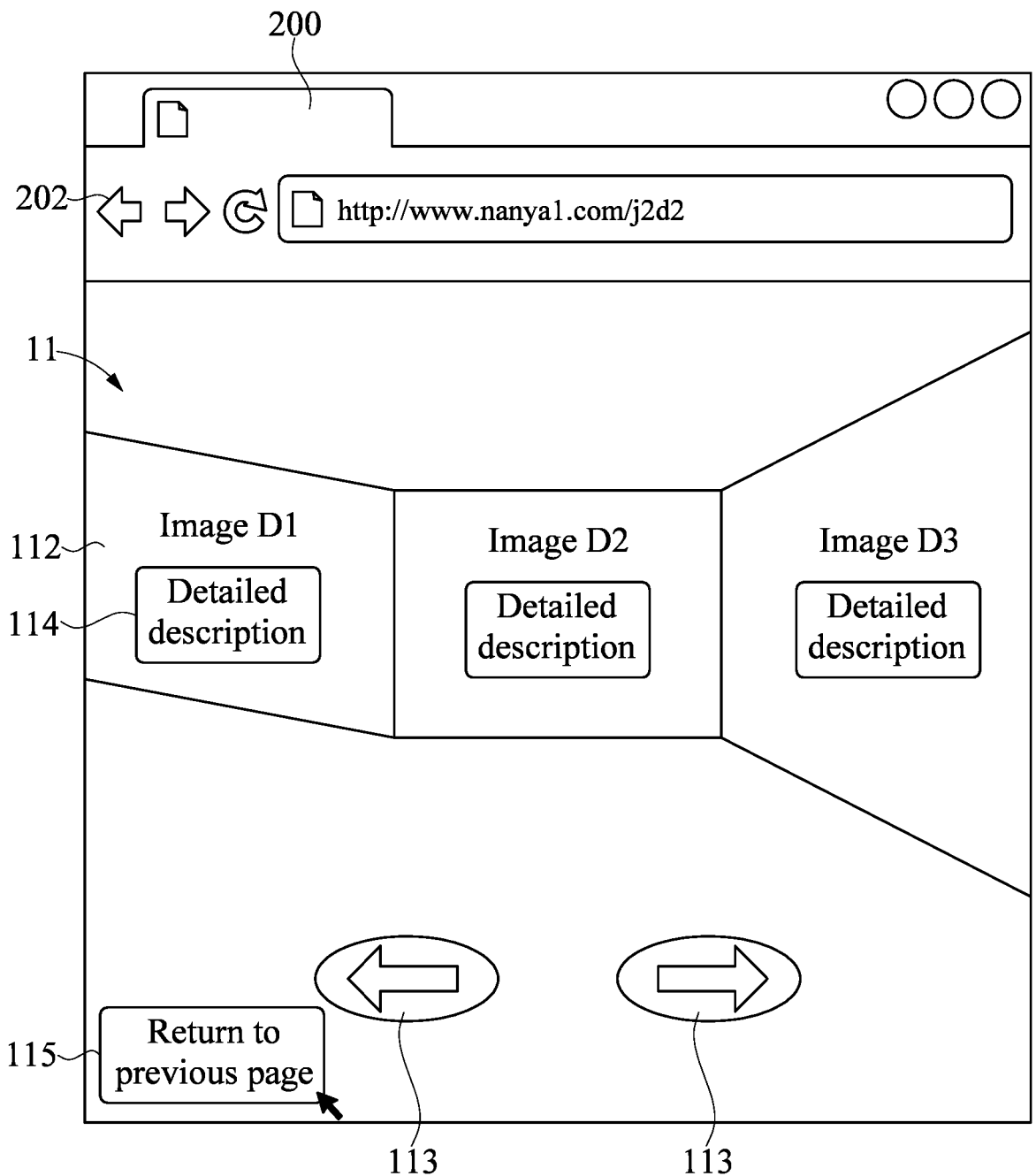

When the user selects the linking option 114A in the information webpage 11 as shown in FIG. 4 and the browser 200 displays the information webpage 11 corresponding to the linking address corresponding to the linking option 114 (as shown in FIG. 5), the browser 200 displays the information webpage 11 of the linking address of "http://www.nanya1.com/j2d2". When the information webpage 11 as shown in FIG. 5 is executed, because the previous webpage address is stored in the storage 201 of the browser 200, the information webpage program 111 will display the previous webpage option 115 in the information webpage 11 as shown in FIG. 5. Furthermore, the webpage address that is included in the previous webpage option 115 at this time is "http://www.nanya1.com? clickhistory=buttonright_1 &buttonright_1".

Figure 6:
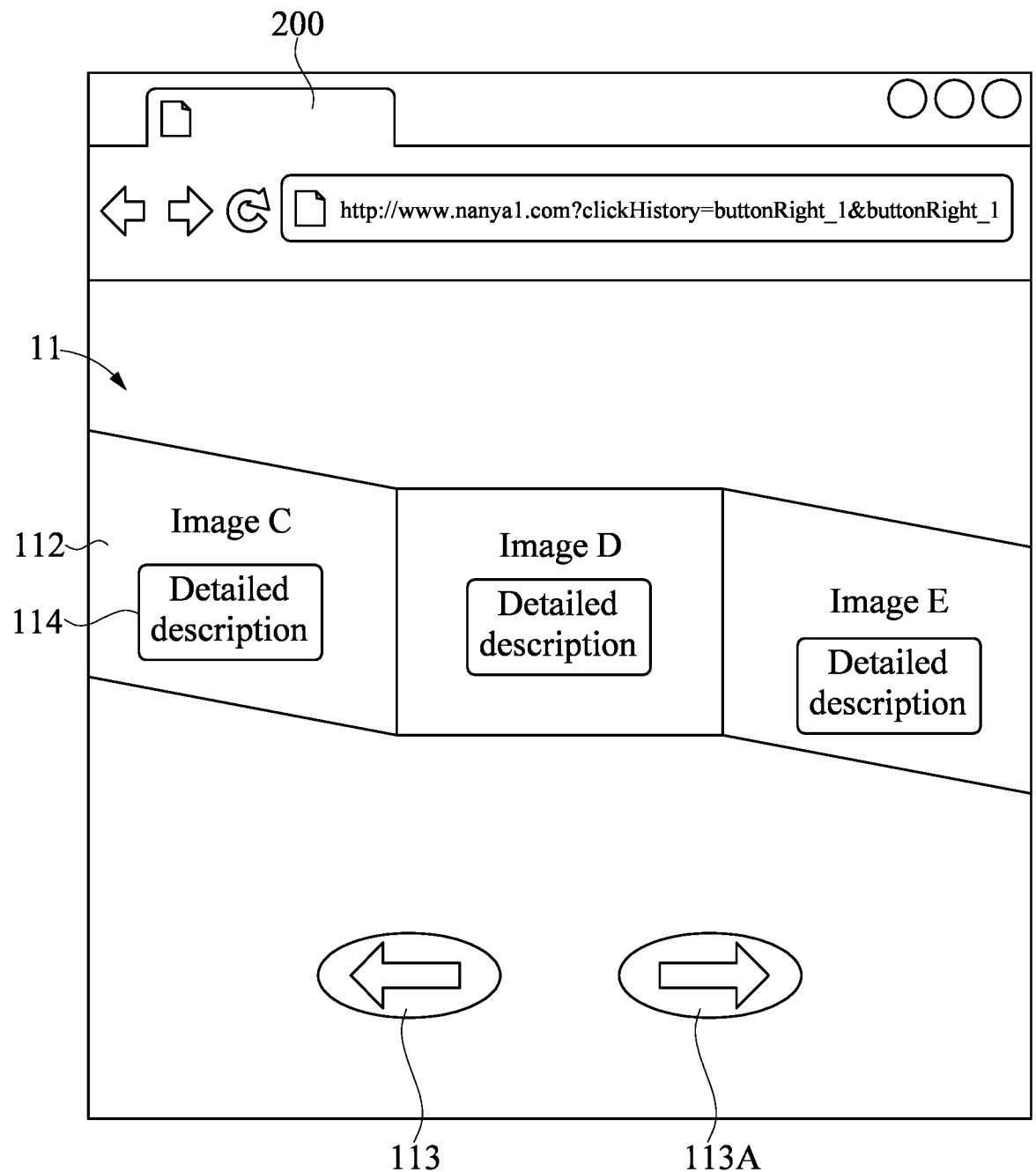

When the previous webpage option 115 of the information webpage 11 as shown in FIG. 5 is selected, the browser 200 displays the information webpage 11 corresponding to the previous webpage address, and the user will view the information webpage 11 as shown in FIG. 6. The information webpage 11 as shown in FIG. 6 is the same as the information webpage 11 as shown in FIG. 4 except for the webpage address; particularly, the images respectively displayed on the virtual reality scene 112 of FIG. 6 and FIG. 4 are exactly the same as each other.

When the information webpage 11 as shown in FIG. 6 is executed, the corresponding information webpage program 111, for example, may first obtain the current webpage address of the information webpage 11 (i.e., "http://www.nanya1.com?clickhistory=buttonright_1& buttonright_1") as shown in FIG. 6 by using the "location.href" command in the JavaScript programming language. The information webpage program 111 can then use the "split( )" process in the JavaScript programming language in coordination with the second preset string (i.e., "?clickhistory=") to split the webpage address of the information webpage 11 as shown in FIG. 6 into strings of "http://www.nanya1.com" and "buttonright_1&buttonright_1". Afterwards, the information webpage program 111 can use the "split( )" process in the JavaScript programming language in coordination with the first preset string (i.e., "&"), to split the string "buttonright_1&buttonright_1" into strings of "buttonright_1" and "buttonright_1". Finally, the information webpage program 111 can use the "click( )" process in the JavaScript programming language to cause the option object having the name of "buttonright_1" (i.e., the movement option 113A) in the information webpage 11 as shown in FIG. 6 to successively execute the "click( )" process two times to simulate the movement option 113A in the information webpage 11 as shown in FIG. 6 being selected two times by the user, so that the virtual reality scene 112 in the information webpage 11 as shown in FIG. 6 will be exactly the same as the virtual reality scene 112 in the information webpage 11 as shown in FIG. 4.

In the existing common websites related to virtual tours, a user will not see the previous webpage option 115 in the information webpage 11 as shown in FIG. 5, and the user can only return to the information webpage 11 as shown in FIG. 4 by selecting a last webpage option 202 of the browser 200 in the information webpage 11 as shown in FIG. 5. When the user selects the last webpage option 202 of the browser 200, the user will see the browser 200 displaying the information webpage 11 as shown in FIG. 2, and the user will not see the information webpage 11 as shown in FIG. 4; that is, the virtual reality scene 112 in the information webpage 11 will return to an initial scene as shown in FIG. 2, and will not return to the scene as shown in FIG. 4.

On the other hand, in the DiskLink system 100 of the present disclosure, by the aforementioned design, the user is allowed to view the previous webpage option 115 in the information webpage 11 as shown in FIG. 5, and the user will view the information webpage 11 as shown in FIG. 6 after selecting the previous webpage option 115. The virtual reality scene 112 in the information webpage 11 as shown in FIG. 6 will be the same as the virtual reality scene 112 in the information webpage 11 as shown in FIG. 4.

Therefore, the DiskLink system 100 of the present disclosure allows the user to have an improved browsing experience when viewing each virtual reality scene 112 in each of the thematic information websites 1, and the user can return to the previously displayed virtual reality scene 112 simply by selecting the previous webpage option 115.

Second Embodiment

Figure 7:
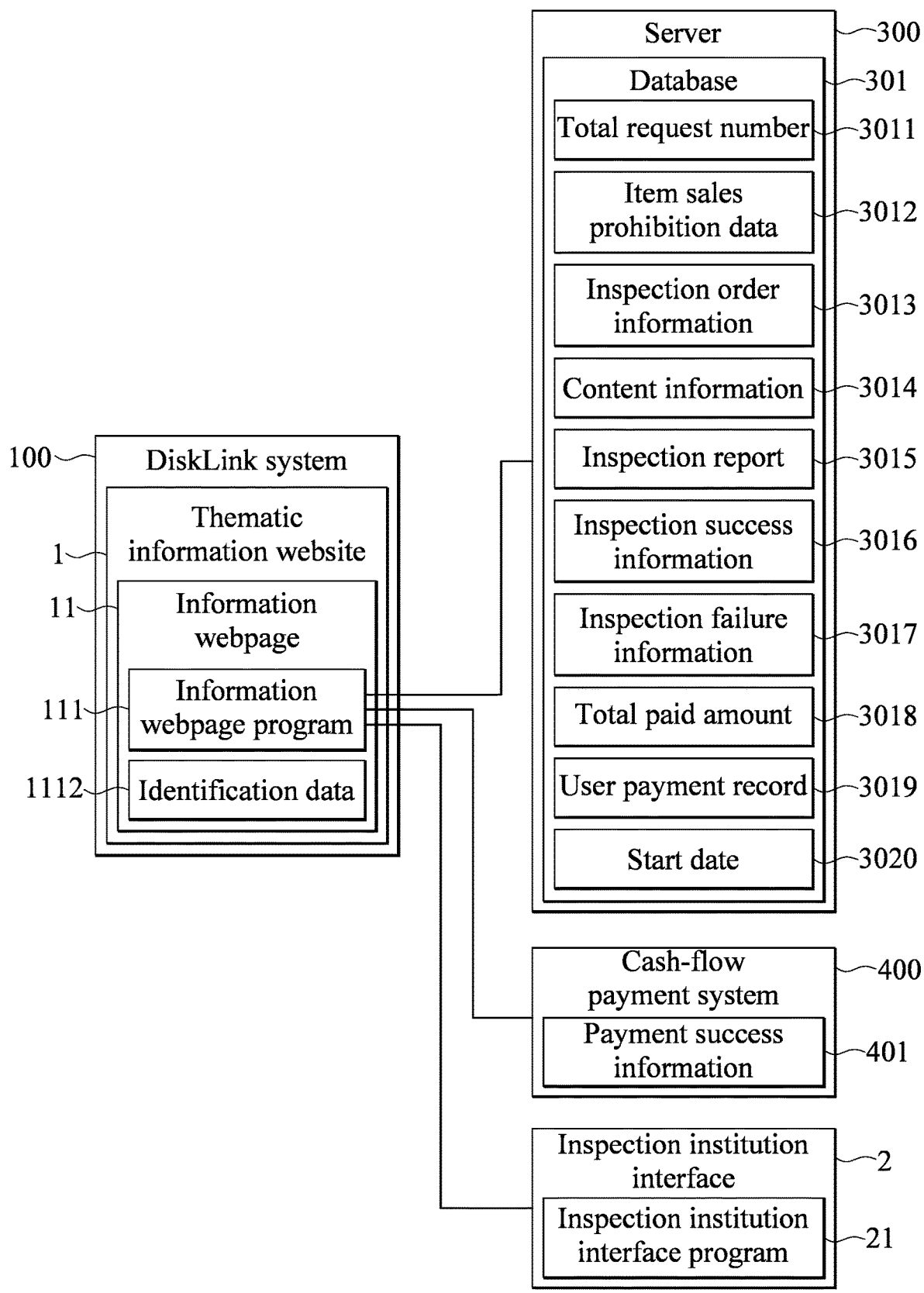
FIG. 7 is a function block diagram of a DiskLink system according to a second embodiment of the present disclosure.
Figure 8:
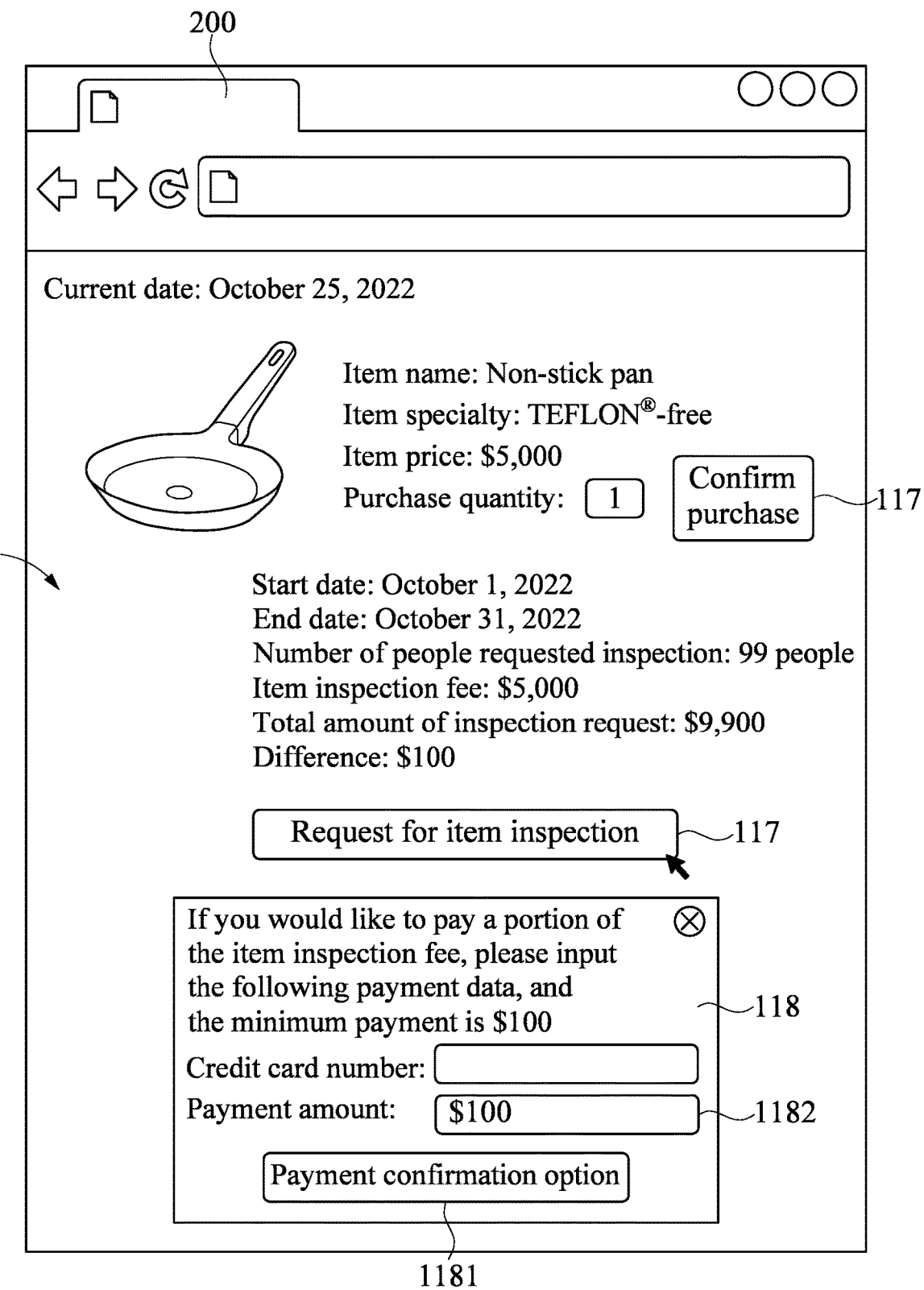
FIG. 8 and FIG. 9 are schematic diagrams of different information webpages of the DiskLink system according to the second embodiment of the present disclosure.
Figure 9:
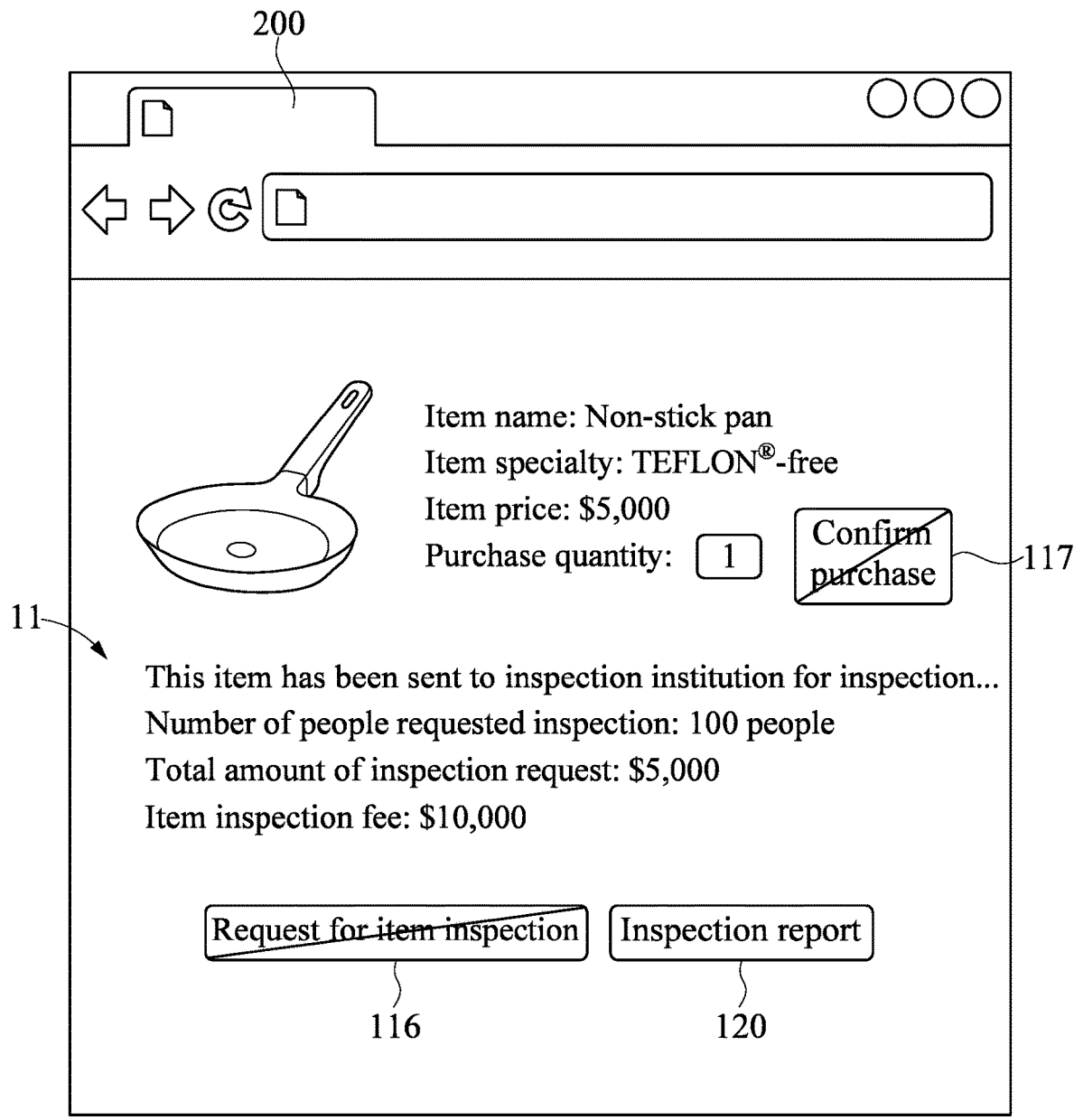
Figure 10:
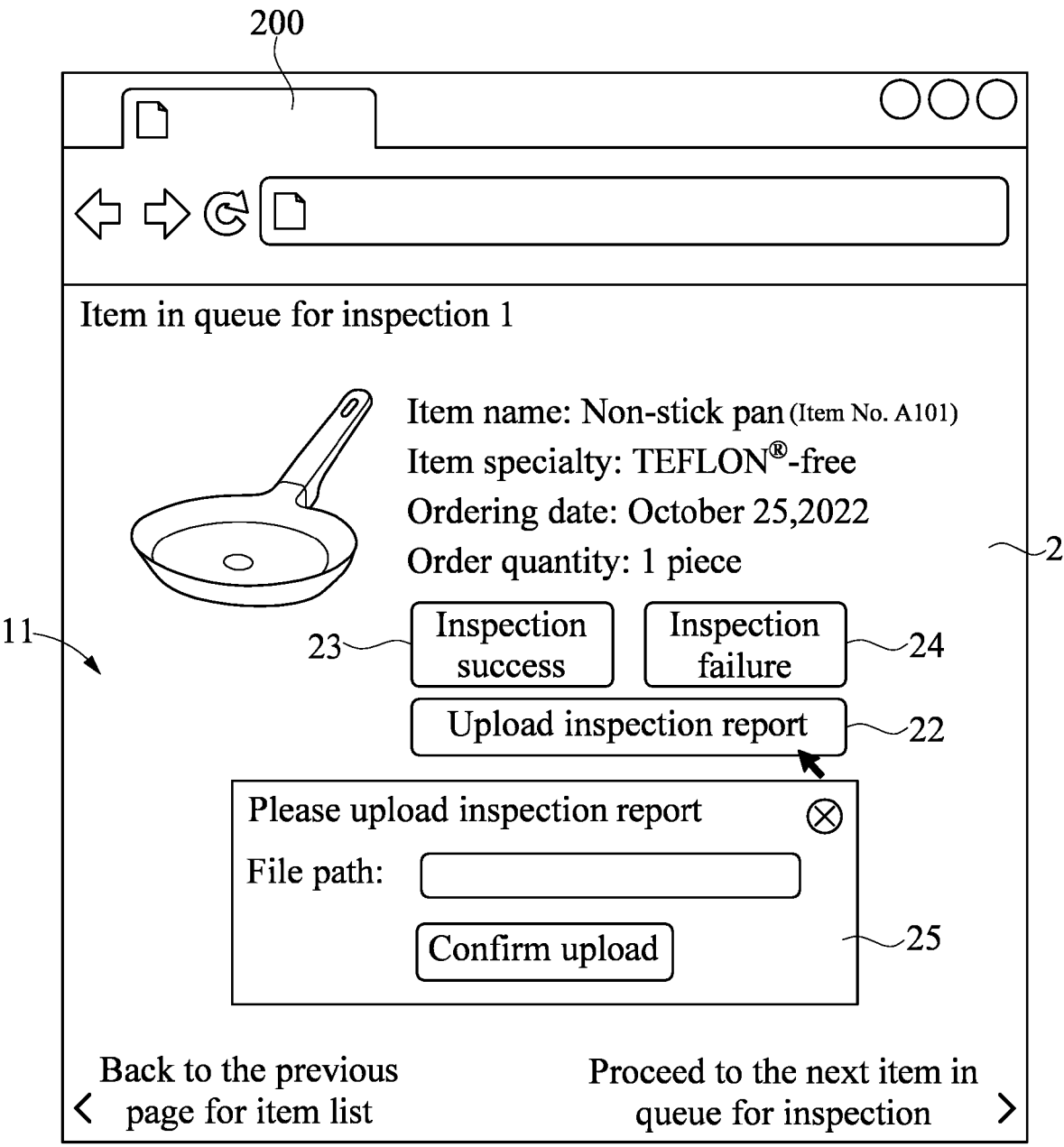
FIG. 10 is a schematic diagram of an inspection institution interface of the DiskLink system according to the second embodiment of the present disclosure.

Referring to FIG. 7 to FIG. 10, FIG. 7 is a function block diagram of a DiskLink system according to a second embodiment of the present disclosure, FIG. 8 and FIG. 9 are schematic diagrams of different information webpages of the DiskLink system according to the second embodiment of the present disclosure, and FIG. 10 is a schematic diagram of an inspection institution interface of the DiskLink system according to the second embodiment of the present disclosure. The present embodiment differs from the first embodiment in that, at least one thematic information web site 1 may be a cloud-based web shopping center, and when each of the information webpages 11 of the cloud-based web shopping center is executed, the information webpage program 111 can use an identification data 1112 (e.g., a unique item number, but it is not limited thereto) of the information webpage 11 to find a total request number 3011 from a database 301 of the server 300, and display the total request number 3011, an inspection request option 116, and an ordering option 117 in the information webpage 11. In practice, the database 301 may store at least one table storing a total request number 3011 for each item number.

As shown in FIG. 8, when the inspection request option 116 is selected, the information webpage program 111 makes the information webpage 11 display a payment window 118 and a payment confirmation option 1181 to require the user to input a payment data (e.g., credit card related data) in the payment window 118. After the payment confirmation option 1181 is selected, the information webpage program 111 transmits the payment data to a cash-flow payment system 400 (e.g., PAYPAL®) to use the cash-flow payment system 400 to transfer a preset amount from an account corresponding to the payment data to a public account and obtain a payment success information 401 returned from the cash-flow payment system 400, and the information webpage program 111 updates the total request number in the information webpage 11 and update the total request number 3011 in the database 301, such that a value of a previous one of the total request number 3011 is added by one and is updated to an updated total request number 3011.

For example, assuming that the item viewed by the user on the information webpage 11 is a non-stick pan, and the item is advertised as being TEFLON®-free in the information webpage 11. If the user is in doubt as to whether or not the non-stick pan is actually TEFLON®-free, the user may select the inspection request option 116 in the information webpage 11. After the user selects the inspection request option 116 of the information webpage 11, the user can see texts such as "Please fill in the following payment data if you would like to pay for a portion of the item inspection fee" in the payment window 118. The payment window 118 may, for example, display texts such as "Please enter your credit card number" to request the user to enter payment data, and the payment window 118 may also, for example, display a default amount (i.e., $100 as shown in the figure).

When the user enters the payment data such as the credit card number of the user in the payment window 118 and selects the payment confirmation option 1181, the information webpage program 111 transmits the payment data input in the payment window 118 to the cash-flow payment system 400 to complete the payment operation of the user. If the user completes the payment operation through the payment window 118, the payment window 118 in the information webpage 11 as shown in FIG. 8 will be closed, and values of strings that are "Number of people requested inspection" and "Total amount of inspection request" and originally displayed in the information webpage 11 will be respectively updated from "99 people" and "$9,900" to "100 people" and "$10,000".

When the total request number 3011 equals to or exceeds a preset total request number (which may, for example, be stored in the information webpage 11 or the database 301), the information webpage program 111 can store an item sales prohibition data 3012 corresponding to the identification data 1112 in the database 301. The information webpage program 111 uses the public account, a physical address of an inspection institution, and the cash-flow payment system 400 to transfer an item amount (i.e., a unit price of the item sold on the information webpage 11) from a public account to a vendor account of a vendor corresponding to the information webpage 11 for establishing an inspection order, so that the item is purchased from the vendor and the vendor sends the item to the physical address of the inspection institution. After the information webpage program 111 stores in the database 301 the item sales prohibition data 3012 corresponding to the identification data 1112, the information webpage program 111 can use the identification data 1112 to find the corresponding item sales prohibition data 3012 in the database 301.

In practice, a value of the preset amount multiplied by the preset total request number is not less than a sum of a unit price of the item that is sold on the information webpage 11 and a preset inspection fee. When the information webpage 11 is executed, if the information webpage program 111 finds a corresponding item sales prohibition data 3012 from the database 301 by using the identification data 1112, the information webpage program 111 makes the information webpage 11 display the ordering option 117 to be prohibited from being selected.

In one of the preferred embodiments, the preset amount is not greater than 10% of the unit price of the item that is sold on the information webpage 11, so that the user will be relatively willing to pay the preset amount if the user has doubts about the promotional content of the vendor on the information webpage 11. In practice, the abovementioned information such as the preset inspection fee, the public account, the physical address of the inspection institution, the item amount, and the vendor account may be stored in the database 301, and the information webpage program 111 may, for example, use the identification data 1112 to find such data in the database 301.

Accordingly, when the user completes the payment, the values of the strings that are "Number of people requested inspection" and "Total amount of inspection request" and displayed on the information webpage 11 will be respectively updated to be 100 and $10,000; at this time, because the number of people requested inspection has reached 100 (i.e., the preset total request number) and the total amount of inspection request ($10,000) is equal to the unit price of the item ($5,000) plus an item inspection fee ($5,000), the information webpage program 111 places an order to purchase the non-stick pan from the vendor and makes the vendor send the non-stick pan to the inspection institution.

As shown in FIG. 9, after the information webpage program 111 completes ordering to purchase the non-stick pan from the vendor, and makes the vendor send the non-stick pan to the inspection institution, the information webpage program 111 makes the ordering option 117 and the inspection request option 116 of the information webpage 11 be prohibited from being selected. Furthermore, the information webpage program 111 may also make the information webpage 11 display a message such as "This item is sent to the inspection institution for inspection".

As shown in FIG. 7 and FIG. 9, after the information webpage program 111 establishes the inspection order, the information webpage program 111 stores in the database 301 an inspection order information 3013 and an content information 3014 that correspond to the identification data 1112. The inspection order information 3013 can exemplarily be data relevant to the inspection order, and the data can be an order date, the item ordered, an order quantity, and an order amount, etc. The content information 3014 is the promotional content displayed on the information webpage 11, such as an item name or item features as shown in FIG. 8. After the information webpage program 111 stores in the database 301 the inspection order information 3013 and the content information 3014 that correspond to the identification data 1112, the information webpage program 111 can use the identification data 1112 to find the corresponding inspection order information 3013 and the content information 3014 from the database 301.

As shown in FIG. 7 and FIG. 10, the DiskLink system 100 of the present disclosure may also include an inspection institution interface 2. When the inspection institution interface 2 is executed, an inspection institution interface program 21 of the inspection institution interface 2 reads the database 301 and display in the inspection institution interface 2 the inspection order information 3013, the content information 3014, an inspection report upload option 22, an inspection success option 23, and an inspection failure option 24. When the inspection report upload option 22 is selected, the inspection institution interface program 21 makes the inspection institution interface 2 display a data upload window 25 requesting an operator to upload an inspection report 3015. After the operator uploads the inspection report 3015 via the data upload window 25, the inspection institution interface program 21 stores in the database 301 the inspection report 3015 corresponding to the identification data 1112.

When the inspection success option 23 is selected, the inspection institution interface program 21 correspondingly generates an inspection success information 3016; when the inspection failure option 24 is selected, the inspection institution interface program 21 correspondingly generates an inspection failure information 3017. After the inspection institution interface program 21 stores in the database 301 the inspection report 3015 corresponding to the identification data 1112 and the inspection success information 3016 (or the inspection failure information 3017), the inspection institution interface program 21 and information webpage program 111 can use the identification data 1112 to find the corresponding inspection report 3015 and the inspection success information 3016 (or the inspection failure information 3017) from the database 301.

As shown in FIG. 7 and FIG. 9, when the information webpage 11 is executed, if the information webpage program 111 finds the inspection report 3015 in the database 301 by using the identification data 1112, the information webpage program 111 displays an inspection report option 120 on the information webpage 11. If the information webpage program 111 finds the inspection failure information 3017 in the database 301 by using the identification data 1112, the information webpage program 111 configures the ordering option 117 displayed on the information webpage 11 to be prohibited from being selected. On the other hand, if the information webpage program 111 finds the inspection success information 3016 in the database 301 by using the identification data 1112, the information webpage program 111 configures the ordering option 117 displayed on the information webpage 11 to be selectable. For example, when the inspection report option 120 is selected, the information webpage program 111 can make the information webpage 11 display the corresponding inspection report, or the information webpage program 111 can make the browser 200 download the inspection report.

Referring further to FIG. 7 and FIG. 8, in one variation of the embodiment, when each of the information webpages 11 of the cloud-based web shopping center is executed, the information webpage program 111 further finds a total paid amount 3018 in the database 301 by using the identification data 1112 of the information webpage 11 and displays in the information webpage 11 the total request number 3011 (i.e., 99 people as shown in FIG. 8), the inspection request option 116, the ordering option 117, and the total paid amount 3018 (i.e., $9900 as shown in FIG. 8). When the inspection request option 116 is selected, the information webpage program 111 can make the information webpage 11 display the payment window 118, the payment confirmation option 1181, and a payment amount input box 1182, and the payment amount input box 1182 allows the user to input a payment amount.

When the payment confirmation option 1181 is selected and the payment amount input box 1182 is used to input the payment amount, the information webpage program 111 transfers the payment amount from an account corresponding to the payment data to the public account by using the cash-flow payment system 400 and obtains the payment success information 401 returned from the cash-flow payment system 400. At this time, the information webpage program 111 updates the information webpage 11, and the total request number 3011 and the total paid amount 3018 of the database 301.

When the total paid amount 3018 exceeds a preset total paid amount (e.g., stored in the database 301), the information webpage program 111 is able to store in the database 301 the item sales prohibition data 3012 corresponding to the identification data 1112, and the information webpage program 111 transfers an item amount from the public account to the vendor account corresponding to the information webpage 11 by using the public account, the physical address of the inspection institution, and the cash-flow payment system 400, so as to establish the inspection order for the vendor to send the item to the physical address of the inspection institution. Moreover, the preset total paid amount is not less than a sum of a unit price of an item that is sold on the information webpage 11 and a preset inspection fee. Specifically, after the information webpage program 111 stores in the database 301 the item sales prohibition data 3012 of the item corresponding to the identification data 1112, the information webpage program 111 can use the identification data 1112 to find the corresponding item sales prohibition data 3012 in the database 301.

For example, after the user selects the inspection request option 116, the user will see the payment window 118 in the information webpage 11, and the preset amount (e.g., $100) will be displayed in the payment amount input box 1182 of the payment window 118. At this time, if the user would like to pay a greater amount, the user may modify the number displayed in the amount input box 1182. With this design, the user can pay a greater amount so that the total amount of inspection request reaches the preset total paid amount more quickly, and the item can be sent for inspection faster.

In one of the preferred embodiments, when the payment confirmation option 1181 is selected and the information webpage program 111 obtains the payment success information 401 that is returned from the cash-flow payment system 400, the information webpage program 111 stores a user payment record 3019 in the database 301 of the server 300. The payment record is, for example, a record of an identity and an account of the user, a payment amount, a payment date, and an identification data of the item. If the information webpage program 111 finds the inspection failure information 3017 in the database 301 by using the identification data 1112, the information webpage program 111 transfers an amount that is equal to the preset amount multiplied by the preset total request amount from the vendor account to the public account via the cash-flow payment system 400, and the information webpage program 111 refunds the preset amount previously paid by the user to a user account by using the cash-flow payment system 400, according to the user payment record 3019 stored in the database 301. In other words, if multiple users select the inspection request option 116 in the information webpage 11, and the relevant inspection institution finds that the vendor promotional content in the information webpage 11 is false, the information webpage program 111 refunds the preset amount previously paid by the user via the cash-flow payment system 400.

Accordingly, in different embodiments, when the information webpage 11 is executed, the information webpage program 111 may also use the identification data 1112 to find whether or not a corresponding start date 3020 is present in the database 301. If the start date 3020 is found, the information webpage program 111 displays the start date 3020 on the information webpage 11. Furthermore, the information webpage program 111 calculates a difference between a current date and the start date 3020. If the information webpage program 111 determines that the difference is greater than a preset number of days (e.g., stored in the information webpage 11 or in the database 301) and that the total request number 3011 is less than the preset total request number, the information webpage program 111 refunds the preset amount previously paid by the user from the public account to the user account of the user via the cash-flow payment system 400 according to the user payment record 3019 stored in database 301.

When the inspection request option 116 is selected and the information webpage program 111 obtains the payment success information 401 that is returned from the cash-flow payment system 400, the information webpage program 111 uses the identification data 1112 to find whether or not the corresponding start date 3020 is present in the database 301. If the start date 3020 is not found, the information webpage program 111 stores a current date in the database 301 as the start date 3020.

For example, when the information webpage 11 as shown in FIG. 8 is executed, the information webpage program 111 can use the identification data 1112 of the information webpage 11 to find the start date 3020 in the database 301 and display the start date 3020 in the information webpage 11. When the user views the information webpage 11 as shown in FIG. 8, the user will know that on Oct. 1, 2022, the inspection request option 116 on this information webpage 11 of a relevant item is selected for the first time. The information webpage 11 may further display an end date that is the start date 3020 plus a preset number of days (e.g., 30 days), and the user may know, by viewing the information webpage 11 as shown in FIG. 8, that from Oct. 1, 2022 to Oct. 25, 2022 (i.e., the current date), 99 people have selected the inspection request option 116 on this information webpage 11, and that the total amount of inspection request has accumulated to be $9,900.

In the example as shown in FIG. 8, at the start of Nov. 1, 2022, the information webpage program 111 determines whether or not the total request number 3011 is less than the preset total request number. If the information webpage program 111 determines that the total request number 3011 is less than the preset total request number, the information webpage program 111 will look up the corresponding user payment record 3019 in the database 301 by using the identification data 1112 of the information webpage 11, and refund the preset amount previously paid by the user from the public account to the user account via the cash-flow payment system 400. In other words, if an insufficient number of people select the inspection request option 116 in the information webpage 11 and complete payment process, and the public account does not have enough money to pay for the purchase of the item of the information webpage 11 and the preset inspection fee to send the item for inspection, the information webpage program 111 performs refund to the users that have previously completed the payment.

Accordingly, the DiskLink system 100 in this embodiment allows consumers to pay a portion of the amount to have the item sent to the relevant inspection institution for inspection, thereby ensuring that the quality of the item is consistent with advertisement that is shown in the information webpage 11. In existing websites, the website owner only provides a platform for selling items, and the website owner does not provide any guarantee for the content advertised by the vendor on the webpage, such that the consumer can only believe the content advertised by the vendor on the webpage. Unless the consumer sends the item to the relevant inspection institution for inspection after purchasing the item, the consumer basically is incapable of confirming whether or not the content advertised by the vendor in the item webpage is true.

In conclusion, by the design of displaying a request for inspection option in the information webpage, the DiskLink system of this embodiment allows multiple users that have doubts about the promotional information displayed in the information webpage to pay a fee less than the unit price of the item to have the item sent to the inspection institution for inspection.

It is worth mentioning that, in one of the variant embodiments of the present disclosure, the DiskLink system may also be operated on multiple computer devices, a blockchain is operated in the DiskLink system, and each of the thematic information websites is a decentralized application.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A computer hardware device for navigating through virtual reality webpages, comprising:
   a storage including a plurality of thematic information websites, wherein each of the plurality of thematic information websites includes a plurality of information webpages, and each of the plurality of information webpages includes an information webpage program; wherein each of the plurality of information webpages is configured to be browsed by a user and presents at least one content information, and at least one of the information webpages displays at least one image of a virtual reality scene; wherein the virtual reality scene is formed by multiple ones of the at least one image;
   a processor configured to process the information webpage program, wherein each of the information webpages displays a plurality of movement options, and the information webpage program makes the information webpage display another one image of the virtual reality scene according to manipulations of the user on the movement options; wherein, each time any of the movement options is selected, the information webpage program stores movement record data in a storage of a browser that executes the information webpage; wherein, when the information webpage program stores a next one of the movement record data in the browser, the information webpage program first loads an original one of the movement record data from the storage, attaches a first preset string to one end of the original one of the movement record data, attaches the next one of the movement record data to one end of the first preset string, and replaces the original one of the movement record data stored in the storage with a movement record data that has the original one of the movement record data, the next one of the movement record data, and the first preset string attached thereon;
   wherein each of the information webpages displays at least one linking option that is configured to move from one information webpage to another information webpage, and the linking option stores a linking address of another one of the information webpage;
   wherein, when any of the linking options is selected, the information webpage program attaches a second preset string to one end of a current webpage address of the information webpage, attaches the movement record data that has the original one of the movement record data and the next one of the movement record data attached thereon in the storage to one end of the second preset string to form a previous webpage address, and stores the previous webpage address in the storage so that the browser displays the information webpage corresponding to the linking address;
   wherein, when any of the information webpages is executed, the information webpage program reads the storage of the browser and determines whether or not the previous webpage address is stored in the storage; wherein, if the information webpage program determines that the previous webpage address is stored in the storage, the information webpage program displays a previous webpage option in the information webpage; wherein, when the previous webpage option is selected, the information webpage program makes the browser display an information webpage that corresponds to the previous webpage address;
   wherein, when any of the information webpages is executed, the information webpage program determines whether or not a webpage address of the information webpage includes the second preset string; wherein, when the information webpage program determines that the webpage address of the information webpage includes the second preset string, the information webpage program uses the second preset string and the first preset string to identify all the movement record data from the webpage address of the information webpage; wherein the information webpage program makes at least one of the movement options of the information webpage be selected according to all the movement record data that are resolved, so that a corresponding image is displayed in the virtual reality scene;
   wherein, the movement options of each of the information webpages are configured to be constructed by using various virtual tour software, and when each time one of the movement options is selected, the information webpage program is configured to store the movement record data in the storage; wherein the movement record data in the storage of the browser corresponds to the movement option that is selected;
   wherein, the first preset string represents the information webpage program identifying which one of the movement options is selected on the information webpage, and the second preset string represents a position identified for splitting the webpage address of the information webpage.

2. The computer hardware device according to claim 1, further being operated in multiple ones of the computer device; wherein a blockchain is operated in the cloud-based information system, and each of the thematic information websites is a decentralized application.

3. The computer hardware device according to claim 1, wherein at least one of the thematic webpages is a cloud-based web shopping center, and when each of the information webpages of the cloud-based web shopping center is executed, the information webpage program uses an identification data of the information webpage to find a total request inspection number from a database of a server, and displays the total request inspection number, and an inspection request option in the information webpage;

wherein, when the inspection request option is selected, the information webpage program makes the information webpage display a payment window and a payment confirmation option for the user to input a payment data in the payment window; wherein, after the payment confirmation option is selected, the information webpage program transmits the payment data to a cash-flow payment system to use the cash-flow payment system to transfer a preset inspection amount from an account corresponding to the payment data to a public account and obtain a payment success information returned from the cash-flow payment system, and the information webpage program updates the information webpage and the total request inspection number in the database, such that a value of a previous one of the total request inspection number is added by one and is updated to an updated total request inspection number;

wherein, when the total request inspection number is equal to a preset total request inspection number, the information webpage program stores an item sales prohibition data corresponding to the identification data in the database; wherein the information webpage program uses the public account, a physical address of an inspection institution, and the cash-flow payment system to transfer an item amount from the public account to a vendor account of a vendor corresponding to the information webpage for establishing an inspection order, so that the vendor sends an item to the physical address of the inspection institution.

4. The computer hardware device according to claim 3, wherein a value of the preset inspection amount multiplied by the preset total request inspection number is not less than a sum of a unit price of the item that is sold on the information webpage and a preset inspection fee.

5. The computer hardware device according to claim 4, wherein the preset inspection amount is not greater than 10% of the unit price of the item that is sold on the information webpage.

6. The computer hardware device according to claim 3, wherein, when the payment confirmation option is selected and the information webpage program obtains the payment success information that is returned from the cash-flow payment system, the information webpage program stores a user payment record in the database of the server;
wherein, when the information webpage is executed, the information webpage program uses the identification data to find whether or not a corresponding inspection start date is present in the database; wherein, if the inspection start date is found, the information webpage program displays the inspection start date on the information webpage;

wherein, when the inspection request option is selected and the information webpage program obtains the payment success information that is returned from the cash-flow payment system, the information webpage program uses the identification data to find whether or not the corresponding inspection start date is present in the database; wherein, if the inspection start date is not found, the information webpage program stores a current date in the database as the inspection start date, and if the information webpage finds the inspection start date, the information webpage program displays the inspection start date on the information webpage;

wherein the information webpage program calculates a difference between the current date and the inspection start date, and if the information webpage program determines that the difference is greater than a preset number of days and the total request inspection number is less than the preset total request inspection number, the information webpage program refunds the preset inspection amount previously paid by the user from the public account to a user account of the user via the cash-flow payment system according to the user payment record stored in the database.

7. The computer hardware device according to claim 3, wherein, after the information webpage program establishes the inspection order, the information webpage program stores in the database an inspection order information and the content information that correspond to the identification data;

wherein, when an inspection institution interface of the cloud-based information system is executed, an inspection institution interface program of the inspection institution interface reads the database and display in the inspection institution interface the inspection order, the content information, an inspection report upload option, an inspection success option, and an inspection failure option; wherein, when the inspection report upload option is selected, the inspection institution interface program makes the inspection institution interface display a data upload window requesting an operator to upload an inspection report; wherein, after the operator uploads the inspection report via the data upload window, the inspection institution interface program stores in the database the inspection report corresponding to the identification data;

wherein, when the inspection success option is selected, the inspection institution interface program correspondingly generates an inspection success information; wherein, when the inspection failure option is selected, the inspection institution interface program correspondingly generates an inspection failure information;

wherein, when the information webpage is executed, if the information webpage program finds the inspection report in the database by using the identification data, the information webpage program displays an inspection report option on the information webpage; wherein, if the information webpage program finds the inspection failure information in the database by using the identification data, the information webpage program configures an ordering option displayed on the information webpage to be prohibited from being selected; wherein, if the information webpage program finds the inspection success information in the database by using the identification data, the information webpage program configures the ordering option displayed on the information webpage to be selectable;

wherein, when the inspection report option is selected, the information webpage program displays the corresponding inspection report on the information webpage, or the information webpage program makes the browser download the inspection report.

8. The computer hardware device according to claim 7, wherein, when the payment confirmation option is selected and the information webpage program obtains the payment success information returned from the cash-flow payment system, the information webpage program stores the user payment record in the database of the server; wherein, if the information webpage program finds an inspection failure information in the database by using the identification data, the information webpage program transfers an amount that is equal to the preset inspection amount multiplied by the preset total request inspection number from the vendor account to the public account via the cash-flow payment system, and the information webpage program refunds the preset inspection amount previously paid by the user to the user account by using the cash-flow payment system, according to the user payment record stored in the database.

9. The computer hardware device according to claim 3, wherein, when each of the information webpages of the cloud-based web shopping center is executed, the information webpage program further finds a total paid amount in the database by using the identification data of the information webpage and displays in the information webpage the total request inspection number, the inspection request option, an ordering option, and the total paid amount;

wherein, when the inspection request option is selected, the information webpage program makes the information webpage display the payment window, the payment confirmation option, and a payment amount input box, and the payment amount input box allows the user to input a payment amount; wherein, when the payment confirmation option is selected and the payment amount input box is used to input the payment amount, the information webpage program transfers the payment amount from an account corresponding to the payment data to the public account by using the cash-flow payment system and obtains the payment success information returned from the cash-flow payment system, and the information webpage program updates the information webpage, and the total request inspection number and the total paid amount of the database;

wherein, when the total paid amount exceeds a preset total paid amount, the information webpage program is able to store in the database the item sales prohibition data corresponding to the identification data, and the information webpage program transfers the item amount from the public account to the vendor account corresponding to the information webpage by using the public account, the physical address of the inspection institution, and the cash-flow payment system so as to establish the inspection order for the vendor to send the item to the physical address of the inspection institution.

10. The computer hardware device according to claim 9, wherein the preset total paid amount is not less than a sum of a unit price of an item that is sold on the information webpage and a preset inspection fee.

* * * * *